United States Patent
Mizuno et al.

(10) Patent No.: US 10,618,594 B2
(45) Date of Patent: Apr. 14, 2020

(54) SWING ARM STRUCTURE FOR SADDLE RIDING VEHICLE

(71) Applicant: HONDA MOTOR CO., LTD., Tokyo (JP)

(72) Inventors: Kunihiro Mizuno, Asaka (JP); Shimpei Shikanai, Kikuchi-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 15/890,649

(22) Filed: Feb. 7, 2018

(65) Prior Publication Data

US 2018/0244337 A1  Aug. 30, 2018

(30) Foreign Application Priority Data

Feb. 24, 2017  (JP) ................. 2017-033832

(51) Int. Cl.
*B62K 25/26* (2006.01)
*B62K 25/28* (2006.01)
*B62K 19/04* (2006.01)
*B60G 3/14* (2006.01)

(52) U.S. Cl.
CPC .............. *B62K 25/26* (2013.01); *B62K 19/04* (2013.01); *B62K 25/283* (2013.01); *B62K 25/286* (2013.01); *B60G 3/145* (2013.01); *B60G 2206/71* (2013.01); *B60G 2300/12* (2013.01)

(58) Field of Classification Search
CPC ...... B62K 25/26; B62K 19/04; B62K 25/283; B62K 25/286; B60G 3/145; B60G 2206/71; B60G 2300/12
See application file for complete search history.

(56) References Cited

U.S. PATENT DOCUMENTS

| 4,437,679 | A | 3/1984 | Campagnolo | |
|---|---|---|---|---|
| 6,182,994 | B1 | 2/2001 | Gogo et al. | |
| 6,932,371 | B2 * | 8/2005 | Perez | B62K 19/04 280/275 |
| 7,597,338 | B2 * | 10/2009 | I | B62K 19/16 280/274 |
| 2013/0168172 | A1 * | 7/2013 | Buell | B62K 11/00 180/220 |

(Continued)

FOREIGN PATENT DOCUMENTS

| DE | 4327459 A1 | 2/1995 |
|---|---|---|
| DE | 102008045927 A1 | 3/2010 |
| JP | 05-139361 | 6/1993 |

OTHER PUBLICATIONS

European Search Report dated Jul. 17, 2018, 5 pages.

*Primary Examiner* — Kevin Hurley
*Assistant Examiner* — Marlon A Arce
(74) *Attorney, Agent, or Firm* — Rankin, Hill & Clark LLP (57) ABSTRACT

A swing arm structure for a saddle riding vehicle including: a pivot section swingably supported by a vehicle body frame of the saddle riding vehicle; an arm section extending from the pivot section toward a rear side of a vehicle body of the saddle riding vehicle and configured to support an axle of a rear wheel of the saddle riding vehicle at a rear section; and a first reinforcement section formed of a carbon fiber reinforced resin in which carbon fibers are oriented uniformly in a vehicle body forward/rearward direction, wherein the first reinforcement section is installed on a lower surface of the arm section.

6 Claims, 4 Drawing Sheets

(56) References Cited

U.S. PATENT DOCUMENTS

2018/0244333 A1* 8/2018 Iwakami ................ B62K 19/12
2018/0251088 A1* 9/2018 Kawamura ............. B60R 19/03
2018/0257589 A1* 9/2018 Kawamura ............. B60R 19/34

* cited by examiner

SWING ARM STRUCTURE FOR SADDLE RIDING VEHICLE

CROSS-REFERENCE TO RELATED APPLICATION

Priority is claimed on Japanese Patent Application No. 2017-033832, filed Feb. 24, 2017, the content of which is incorporated herein by reference.

BACKGROUND

Field of the Invention

The present invention relates to a swing arm structure for a saddle riding vehicle.

Description of Related Art

A saddle riding vehicle such as a motorcycle or the like has a swing arm that supports a rear wheel, which is vertically swingably supported on a vehicle body frame. A high bending rigidity in an upward/downward direction is required because a weight of a vehicle body or an occupant, or a pushing-up load or the like from a road surface, is input to the swing arm.

For this reason, the swing arm is conventionally formed of a metal material such that a cross section in a direction crossing a vehicle body forward/rearward direction has a substantially rectangular shape that is wider in a vertical width than a lateral width. In addition, a swing arm obtained by attaching a carbon fiber reinforced resin in which carbon fibers are oriented in a matrix to a surface of a resin core has been proposed as a swing arm formed of a material other than a metal material (for example, see Japanese Unexamined Patent Application, First Publication No. H05-139361).

SUMMARY

However, when the swing arm is formed of a metal material in a substantially rectangular cross section having a vertical width larger than a lateral width, in order to avoid occurrence of a blowhole or misrun of melted metal during casting, a ratio of a thickness of a sidewall with respect to a thickness of upper and lower walls of the swing arm needs to be kept to a certain level or more. That is, when the ratio of the thickness of the sidewall with respect to the thickness of the upper and lower walls of the swing arm is lowered under a certain level, a blowhole is likely to occur in the upper and lower walls during casting, and misrun of melted metal is likely to occur in the sidewall. For this reason, due to limitations in manufacture, it is difficult to make appropriate bending properties of the swing arm in a leftward/rightward direction and a high rigidity in an upward/downward direction compatible, and it has been a reason for increasing the manufacturing costs.

In addition, in the swing arm disclosed in Japanese Unexamined Patent Application, First Publication No. H05-139361 which is obtained by attaching the carbon fiber reinforced resin that has oriented carbon fibers in a matrix manner at a surface thereof, both of a rigidity of the swing arm in the upward/downward direction and a rigidity in the leftward/rightward direction are simultaneously increased, it is also difficult to make appropriate bending properties in the leftward/rightward direction and a high rigidity in the upward/downward direction compatible, and it is desirable to improve a turning ability of the vehicle. In addition, in the case of the swing arm disclosed in Japanese Unexamined Patent Application, First Publication No. H05-139361, since the carbon fibers are oriented in a matrix manner, an amount of carbon fibers used is increased leading to an increase in manufacturing costs.

An aspect of the present invention is to provide a swing arm structure for a saddle riding vehicle in which a ratio between a rigidity of an arm section in an upward/downward direction and a rigidity in a leftward/rightward direction is appropriately set and the turning ability of a vehicle is improved while minimizing increase in manufacturing costs.

A swing arm structure for a saddle riding vehicle according to the present invention employs the following configuration.

(1) A swing arm structure for a saddle riding vehicle according to the present invention includes a pivot section swingably supported by a vehicle body frame of the saddle riding vehicle; an arm section extending from the pivot section toward a rear side of a vehicle body of the saddle riding vehicle and configured to support an axle of a rear wheel of the saddle riding vehicle at a rear section; and a first reinforcement section formed of a carbon fiber reinforced resin in which carbon fibers are oriented uniformly in a vehicle body forward/rearward direction, wherein the first reinforcement section is installed on a lower surface of the arm section.

According to the above-mentioned configuration, when a load in a pushing-up direction is input to the arm section 23 through the rear wheel, a bending deformation toward a side above the lower surface of the arm section in the forward/rearward direction is suppressed by the carbon fibers of the first reinforcement section. For this reason, a rigidity of the lower surface of the arm section with respect to the input load in the upward direction applied to the rear section of the arm section can be efficiently enhanced. In addition, since the first reinforcement section is formed so that the carbon fibers are oriented only in the forward/rearward direction instead of being oriented in a matrix manner, it is possible to reduce an amount of carbon fibers used and to reduce the manufacturing costs. Accordingly, a ratio between the rigidity of the arm section in the upward/downward direction and the rigidity in the leftward/rightward direction can be appropriately set while minimizing increase in manufacturing costs.

In addition, since the first reinforcement section formed of the carbon fiber reinforced resin is installed at the lower surface of the arm section, a torsional rigidity of the arm section during turning of the vehicle can be secured. For this reason, a turning performance of the vehicle can be improved.

(2) In the aspect of the above mentioned (1), a second reinforcement section formed of a carbon fiber reinforced resin in which carbon fibers are oriented uniformly in the vehicle body forward/rearward direction may be installed on an upper surface of the arm section.

In this case, a bending deformation of the upper surface of the arm section toward a lower side in the forward/rearward direction according to an irregular portion of a road surface or driving of the rear wheel is suppressed by the carbon fibers of the second reinforcement section.

It is possible to efficiently enhance a rigidity of the upper surface of the arm section with respect to an input load in a downward direction applied to the rear section of the arm section. In addition, since the second reinforcement section is formed so that the carbon fibers are oriented only in the forward/rearward direction instead of being oriented in a matrix manner, it is possible to reduce an amount of carbon fibers used and to reduce the manufacturing costs. Accordingly, a ratio between a rigidity of the arm section in the upward/downward direction and a rigidity in the leftward/rightward direction can be appropriately set while minimizing increase in manufacturing costs.

In addition, since the second reinforcement section formed of the carbon fiber reinforced resin is installed on the upper surface of the arm section, a torsional rigidity with respect to a twist load applied to the arm section during acceleration and turning of the vehicle can be secured. For this reason, a turning performance of the vehicle can be further improved.

(3) In the aspect of the above mentioned (2), the first reinforcement section and the second reinforcement section may be connected with each other by a third reinforcement section formed of a carbon fiber reinforced resin installed on the pivot section.

In this case, a rigidity of the pivot section is enhanced by the third reinforcement section and a positional deviation of the first reinforcement section and the second reinforcement section is suppressed by the third reinforcement section. In addition, when the first reinforcement section, the second reinforcement section and the third reinforcement section are continuously formed by the carbon fiber reinforced resin, it is possible to reduce the number of parts and further reduce the manufacturing costs. In addition, it is also possible to perform an operation of coupling the carbon fiber reinforced resin with respect to the main body section of the swing arm more easily.

(4) In the aspect of any one of the above mentioned (1) to (3), the arm section may be constituted by a left arm section and a right arm section extending from the pivot section and configured to support the rear wheel from both of left and right sides.

In this case, since the first reinforcement section formed of the carbon fiber reinforced resin is installed on the left arm section and the right arm section disposed on the left side of the rear wheel, a twist load applied to the swing arm during turning of the vehicle can be borne by the left arm section and the right arm section having an appropriate rigidity. Accordingly, when this configuration is applied, a turning performance of the vehicle is further improved.

(5) In the aspect of the above mentioned (2), a chain cover of the saddle riding vehicle, which is configured to protect a drive chain of the saddle riding vehicle for driving the rear wheel, may be formed integrally with the second reinforcement section at the upper surface of the arm section.

In this case, since the chain cover is formed integrally with the second reinforcement section at the upper surface of the arm section, it is possible to reduce the number of parts and to further reduce the manufacturing costs.

(6) In the aspect of the above mentioned (2) or (5), a rear fender of the saddle riding vehicle, which is configured to cover over the rear wheel, may be formed integrally with the second reinforcement section at the upper surface of the arm section.

In this case, since the rear fender is formed integrally with the second reinforcement section at the upper surface of the arm section, it is possible to reduce the number of parts and to further reduce the manufacturing costs.

According to the aspect of the present invention, since the first reinforcement section formed of the carbon fiber reinforced resin in which the carbon fibers are oriented uniformly in the vehicle body forward/rearward direction is installed on the lower surface of the arm section, a ratio between the rigidity of the arm section in the upward/downward direction and the rigidity in the leftward/rightward direction can be appropriately set while minimizing increase in manufacturing costs. For this reason, the turning ability of the vehicle is improved.

DETAILED DESCRIPTION OF EMBODIMENTS

Hereinafter, embodiments of the present invention will be described on the basis of the accompanying drawings. Further, directions of forward, rearward, leftward, rightward, and the like described below are the same as directions in a vehicle described below unless the context clearly indicates otherwise. In addition, in the drawings, an arrow FR showing a forward direction with respect to a vehicle, an arrow UP showing an upward direction with respect to the vehicle, and an arrow LH showing a leftward direction with respect to the vehicle are provided.

Figure 1:
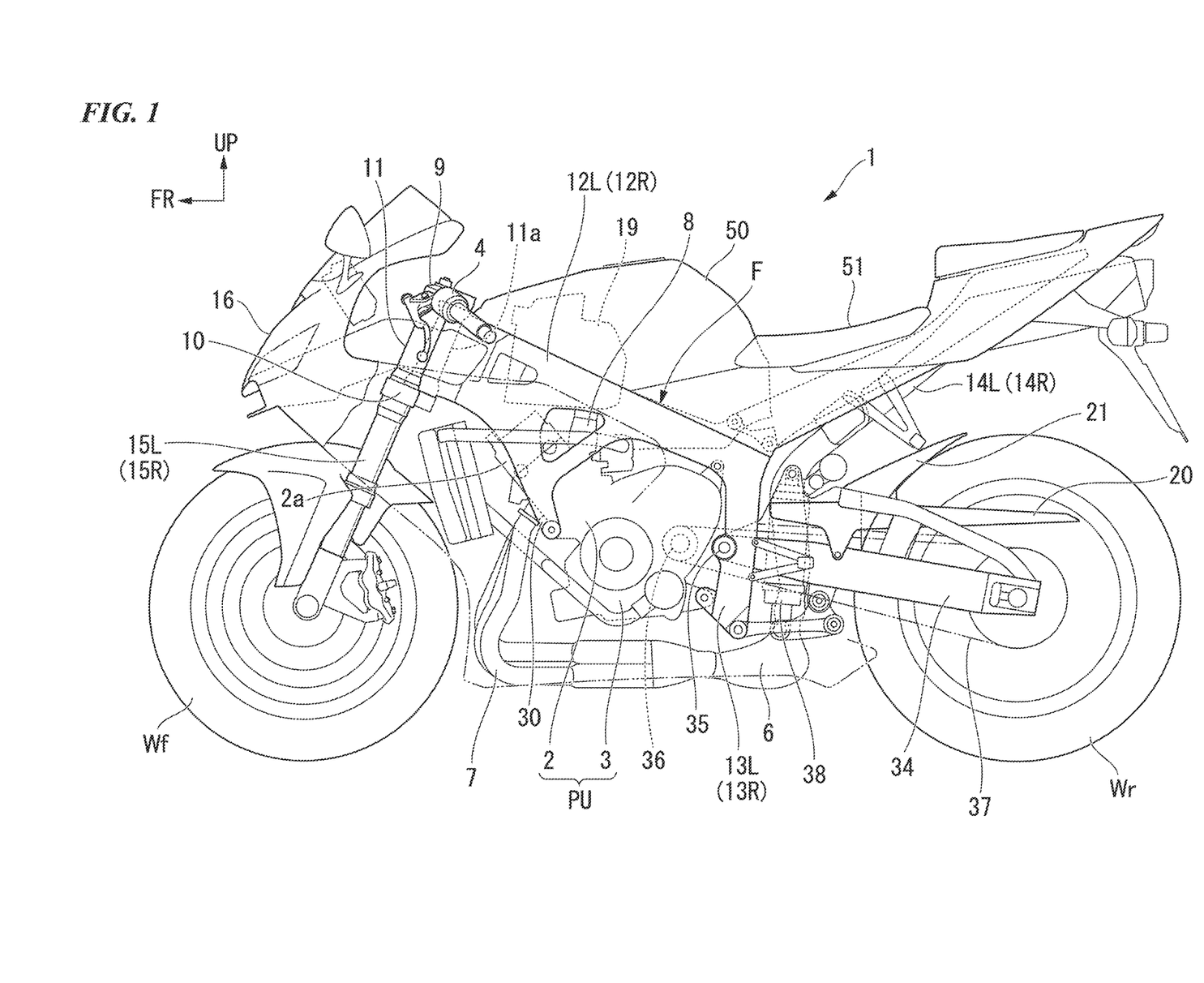
FIG. 1 is a side view of a saddle riding vehicle of a first embodiment of the present invention.

FIG. 1 is a view showing a saddle riding vehicle according to the embodiment from a left side.

The saddle riding vehicle according to the embodiment is a motorcycle having a front wheel Wf and a rear wheel Wr, and the rear wheel Wr is driven by an engine 2. Hereinafter, the saddle riding vehicle of the embodiment is also referred to as "a motorcycle 1."

A vehicle body frame F of the motorcycle 1 includes a head section 11 disposed on a front end portion and configured to pivotably support a steering shaft (not shown), a pair of left and right main frames 12L and 12R extending rearward and downward diagonally from the head section 11 and branching off to left and right sides, a pair of left and right pivot plates 13L and 13R extending downward from rear regions of the main frames 12L and 12R, and a pair of left and right seat frames 14L and 14R extending from rear end portions of the main frames 12L and 12R toward a diagonally rearward and upward side of the vehicle body. A head pipe 11a configured to axially support the steering shaft is installed in the head section 11.

Further, members among the above-mentioned members that are not seen due to overlapping in front of and behind the drawings (for example, the main frame 12R) are designated by reference numerals with parentheses for convenience of illustration. In the following description, members that are not seen due to overlapping in front of and behind the drawings are treated similarly.

A top bridge 9 and a bottom bridge 10 are fixed to upper and lower end portions of the steering shaft supported by the head section 11. Left and right front forks 15L and 15R serving as suspension members are supported by the top bridge 9 and the bottom bridge 10. The front wheel Wf is rotatably and axially supported by lower end portions of the front forks 15L and 15R. A steering handle 4 is attached to an upper section of the top bridge 9.

In addition, a front cowl 16 configured to cover a front side of the head section 11 is attached to the bottom bridge 10.

A fuel tank 50 is attached to upper sections of the main frames 12L and 12R. A seat 51 on which an occupant sits is supported by the seat frames 14L and 14R of a rear section side of the fuel tank 50.

A power unit PU having the engine 2 and a transmission gear 3 as main elements is installed below the main frames 12L and 12R. The power unit PU is supported by the main frames 12L and 12R and the pivot plates 13L and 13R. The engine 2 of the power unit PU has a cylinder section 2a standing up at a side above the front section. An intake pipe 8 is connected to a side above the cylinder section 2a, and an exhaust pipe 7 is connected to a lower side of the cylinder section 2a.

Hanger sections 30 extending rearward and downward diagonally are installed integrally with lower edges closer to front sections of the left and right main frames 12L and 12R. A portion of the engine 2 is supported by the hanger sections 30.

An air cleaner 19 is connected to the intake pipe 8 via a throttle body (not shown). The air cleaner 19 is disposed between the left and right main frames 12L and 12R above the cylinder section 2a.

In addition, the exhaust pipe 7 is routed from a lower side of the cylinder section 2a toward a rear side of the vehicle body, and a muffler 6 is connected to a rear end portion thereof.

A pivot shaft 35 is installed at the left and right pivot plates 13L and 13R. A front end portion of a swing arm 34 is axially supported by the pivot shaft 35 to be vertically swingable. The rear wheel Wr is rotationally and axially supported on a rear end portion of the swing arm 34. An axle of the rear wheel Wr is connected to an output shaft 36 of the power unit PU via a drive chain 37 to enable power transmission. A chain cover 20 configured to cover over the drive chain 37 and protect the drive chain 37 is attached to the swing arm 34. In addition, a rear fender 21 configured to cover an upper side of a front section of the rear wheel Wr is formed integrally with the chain cover 20.

Further, a cushion unit 38 is interposed between a front edge portion of the swing arm 34 and the seat frames 14L and 14R.

Figure 2:
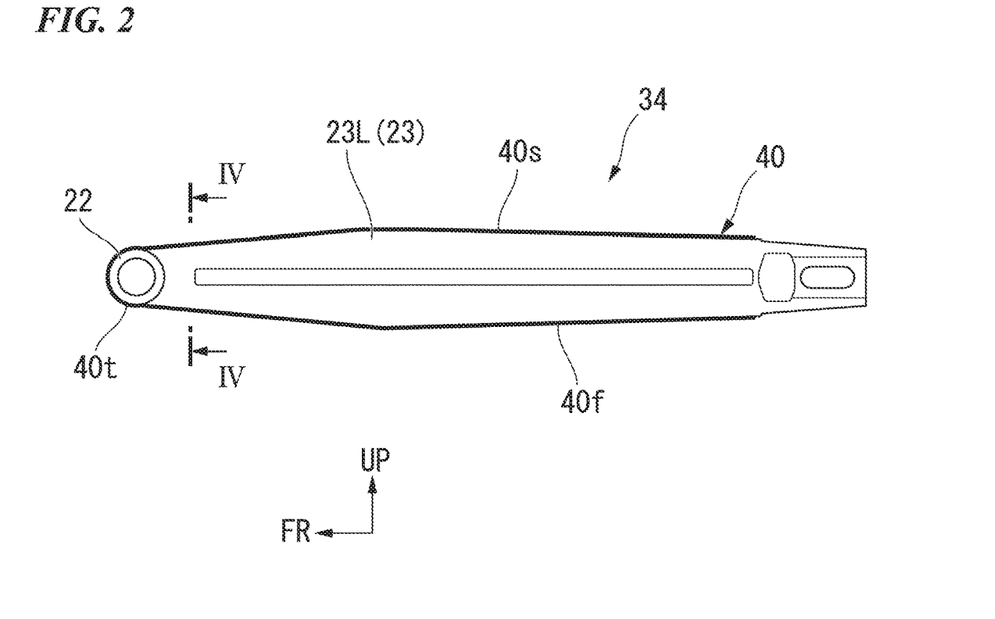
FIG. 2 is a side view of a swing arm of the first embodiment of the present invention.
Figure 3:
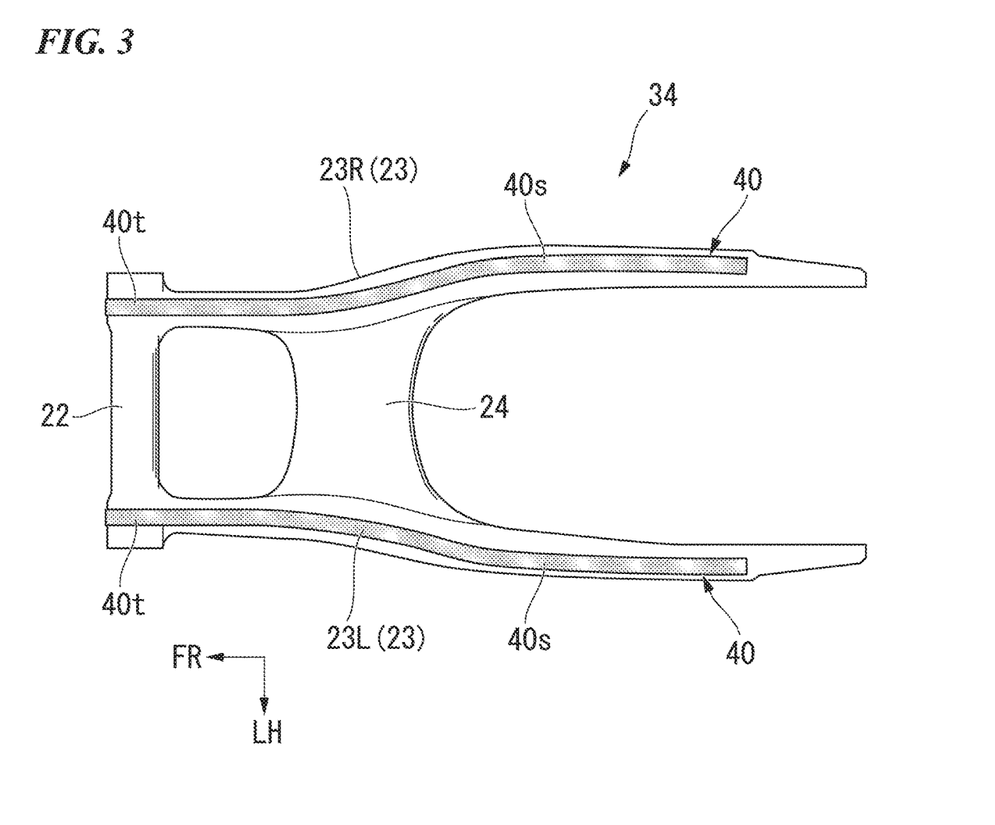
FIG. 3 is a plan view of the swing arm of the first embodiment of the present invention.

FIG. 2 is a view showing the swing arm 34 from a left side, and FIG. 3 is a view showing the swing arm 34 from above. In addition, FIG. 4 is a view showing a cross section taken along line IV-IV in FIG. 2.

The swing arm 34 includes a pivot section 22 vertically swingably supported on the left and right pivot plates 13L and 13R (the vehicle body frame F), and an arm section 23 extending from the pivot section 22 toward a rear side of the vehicle body and configured to support an axle of the rear wheel Wr at the rear section. The swing arm 34 of the embodiment is a double-supported type swing arm in which the axle of the rear wheel Wr is supported from both of left and right sides, and the arm section 23 is constituted by a left arm section 23L extending from a left end portion of the pivot section 22 toward a rear side of the vehicle body, and a right arm section 23R extending from a right end portion of the pivot section 22 toward the rear side of the vehicle body. In addition, the swing arm 34 includes a cross member 24 configured to connect the left arm section 23L disposed at a rear side position of the pivot section 22 and a front edge portion of the right arm section 23R.

The swing arm 34 is a cast article, a substantially entire region of which is formed of a metal material such as an aluminum alloy or the like, and a series of elongated belt-shaped pieces 40 formed of a carbon fiber reinforced resin is adhered to a portion of a surface of the cast section. The carbon fiber reinforced resin of the belt-shaped piece 40 is formed such that carbon fibers are uniformly oriented in a longitudinal direction.

Figure 4:
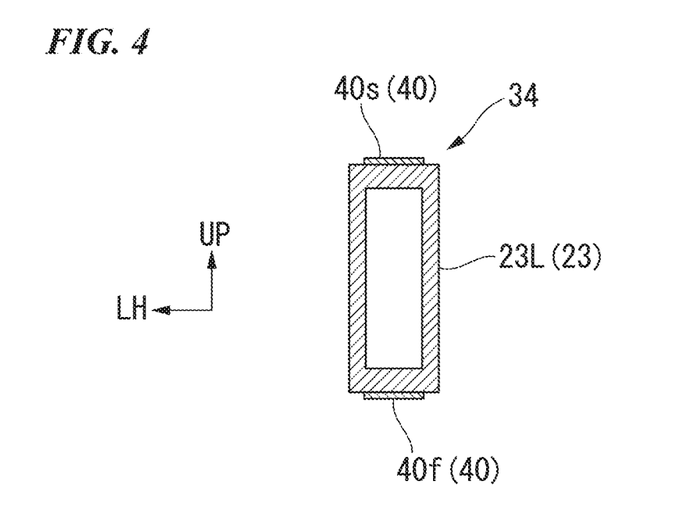
FIG. 4 is a cross-sectional view taken along line IV-IV in FIG. 2 of the swing arm of the first embodiment of the present invention.

As shown in FIG. 4, a cross section in a direction crossing the vehicle body forward/rearward direction of the main sections of the left arm section 23L and the right arm section 23R are formed in a substantially rectangular hollow shape in which a vertical width is larger than a lateral width.

Two belt-shaped pieces 40 adhered to the surface of the cast section of the swing arm 34 are provided. One of the belt-shaped pieces 40 is adhered to an upper surface of the left arm section 23L substantially along the forward/rearward direction, wraps around an outer circumferential surface of the pivot section 22 from the front end portion of the left arm section 23L to be adhered to the outer circumferential surface, and further, is adhered to a lower surface of the left arm section 23L substantially along the forward/rearward direction. In addition, the other belt-shaped piece 40 is adhered to the upper surface of the right arm section 23R substantially along the forward/rearward direction, wraps around the outer circumferential surface of the pivot section 22 from the front end portion of the right arm section 23R to be adhered to the outer circumferential surface, and further, is adhered to the lower surface of the right arm section 23R substantially along the forward/rearward direction.

Regions of the belt-shaped pieces 40 adhered to the lower surfaces of the left arm section 23L and the right arm section 23R constitute first reinforcement sections 40f configured to reinforce the lower surfaces of the arm sections 23L and 23R, and regions of the belt-shaped pieces 40 adhered to the upper surfaces of the left arm section 23L and the right arm section 23R constitute second reinforcement sections 40s configured to reinforce the upper surfaces of the arm sections 23L and 23R. The carbon fibers included in the first reinforcement sections 40f and the second reinforcement sections 40s are oriented uniformly in the vehicle body forward/rearward direction. In addition, regions of the belt-shaped pieces 40 adhered to the pivot section 22 constitute third reinforcement sections 40t configured to connect the first reinforcement sections 40f and the second reinforcement sections 40s.

Further, while the belt-shaped pieces 40 having a constant width of the carbon fiber reinforced resin are adhered to portions of the upper surfaces of the left arm section 23L and the right arm section 23R in FIG. 3, the carbon fiber reinforced resin may be adhered to the entire region of the upper and lower surfaces of the left arm section 23L and the right arm section 23R. In this case, for example, the belt-shaped pieces having a large width of the carbon fiber reinforced resin are adhered to the upper and lower surfaces of the right arm section 23L and the left arm section 23R, and then, portions of the belt-shaped pieces protruding from the arm sections may be cut off.

As described above, in the swing arm structure according to the embodiment, the first reinforcement section 40f formed of a carbon fiber reinforced resin in which carbon fibers are oriented uniformly in the vehicle body forward/rearward direction is installed on the lower surface of the arm section 23. For this reason, during steering of the vehicle, when a load in a pushing-up direction is input to the arm section 23 through the rear wheel Wr, a bending deformation toward a side above the lower surface of the arm section 23 (deformation in the forward/rearward direction) is suppressed by the carbon fibers of the first reinforcement section 40f. Accordingly, in the swing arm structure according to the embodiment, a rigidity of a lower surface side of the arm section 23 with respect to an input load in an upward direction applied to a rear section of the arm section 23 can be efficiently enhanced.

Then, when the swing arm structure according to the embodiment is employed, since a bending rigidity of the arm section 23 in an upward direction can be enhanced while reducing the thickness of the upper wall or the lower wall of the cast section of the arm section 23, it is possible to keep a ratio of the thickness of the sidewall with respect to the thickness of the upper and lower walls of the cast section of the arm section 23 to a certain level or more and to reduce the thickness of the sidewall. Accordingly, appropriate bending properties of the arm section 23 in the leftward/rightward direction and a high rigidity in the upward/downward direction can be obtained without causing a blowhole or misrun of melted metal during casting of the swing arm. For this reason, a turning ability of the vehicle is improved.

In addition, in the case of the swing arm structure of the embodiment, since the first reinforcement section 40f is formed so that the carbon fibers are oriented uniformly only in the forward/rearward direction instead of being oriented in a matrix manner, an amount of carbon fibers used can be minimized, and manufacturing costs can be reduced. Accordingly, when the swing arm structure of the embodiment is employed, a ratio between the rigidity of the arm section 23 in the upward/downward direction and the rigidity in the leftward/rightward direction can be appropriately set while minimizing increase in manufacturing costs. Accordingly, the turning ability of the vehicle can be improved.

In addition, in the swing arm structure of the embodiment, since the first reinforcement section 40f formed of the carbon fiber reinforced resin is installed on the lower surface of the arm section 23, a torsional rigidity of the arm section 23 during turning of the vehicle can be appropriately secured. Accordingly, when this configuration is employed, a turning performance of the vehicle can also be improved.

Further, in the swing arm structure according to the embodiment, the second reinforcement section 40s formed of the carbon fiber reinforced resin in which carbon fibers are oriented uniformly in the vehicle body forward/rearward direction is installed on the upper surface of the arm section 23. For this reason, a bending deformation of the upper surface of the arm section 23 toward a lower side (deformation in the forward/rearward direction) according to an irregular portion of a road surface or driving of a the rear wheel Wr is suppressed by the carbon fibers of the second reinforcement section 40s.

Accordingly, a rigidity of the upper surface of the arm section 23 with respect to an input load in a downward direction applied to the rear section of the arm section 23 can be efficiently enhanced.

In addition, in the case of the embodiment, like the first reinforcement section 40f of the lower surface side, the second reinforcement section 40s also has a structure in which carbon fibers are oriented only in the forward/rearward direction instead of being oriented in a matrix manner. Accordingly, an amount of carbon fibers used can be suppressed to a low level, and manufacturing costs can be reduced.

In addition, in the swing arm structure of the embodiment, since the second reinforcement section 40s formed of the carbon fiber reinforced resin is installed on the upper surface of the arm section 23, a torsional rigidity with respect to the twist load applied to the arm section 23 during acceleration and turning of the vehicle can be appropriately secured. Accordingly, when this configuration is employed, a turning performance of the vehicle is further improved.

In the swing arm structure according to the embodiment, the first reinforcement section 40f at the lower surface side and the second reinforcement section 40s at the upper surface side are connected to each other by the third reinforcement section 40t formed of the carbon fiber reinforced resin installed at the pivot section 22. For this reason, a rigidity of the pivot section 22 can be increased by the third reinforcement section 40t, and a positional deviation of the first reinforcement section 40f and the second reinforcement section 40s on the arm section 23 can be suppressed by the third reinforcement section 40t.

In addition, when the first reinforcement section 40f to the third reinforcement section 40t and the first reinforcement section 40f to the second reinforcement section 40s is formed by a continuous carbon fiber reinforced resin as described in the embodiment, it is possible to reduce the number of parts and to perform an operation of coupling the carbon fiber reinforced resin with respect to the cast section more easily.

In addition, in the swing arm structure according to the embodiment, the arm section 23 is constituted by the left arm section 23L and the right arm section 23R extending from the pivot section 22 and configured to support the rear wheel Wr from both of left and right sides. For this reason, it is possible to receive a twist load applied during turning of the vehicle by the left arm section 23L and the right arm section 23R having a rigidity enhanced by the first reinforcement section 40f, the second reinforcement section 40s and the third reinforcement section 40t, which are formed of the carbon fiber reinforced resin.

Accordingly, when this configuration is employed, turning operability of the vehicle is further increased.

Further, the carbon fiber reinforced resin should be provided at least on the lower surface side of the arm section 23.

Figure 5:
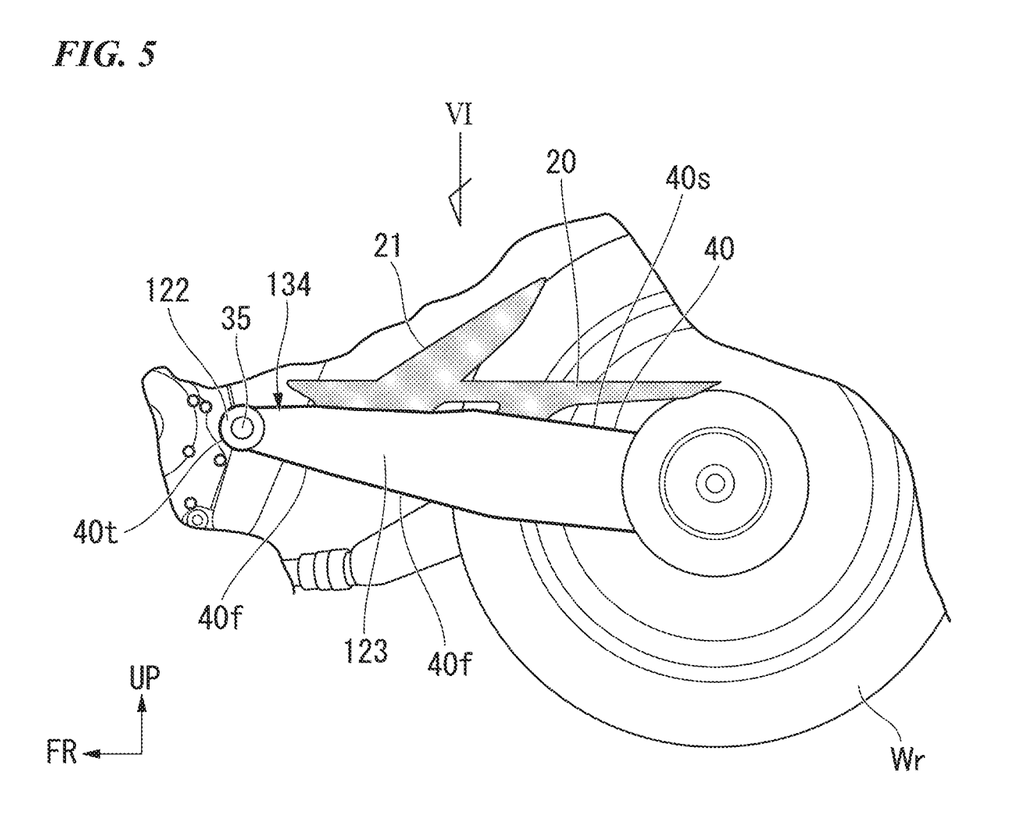
FIG. 5 is a side view of a saddle riding vehicle according to a second embodiment of the present invention.
Figure 6:
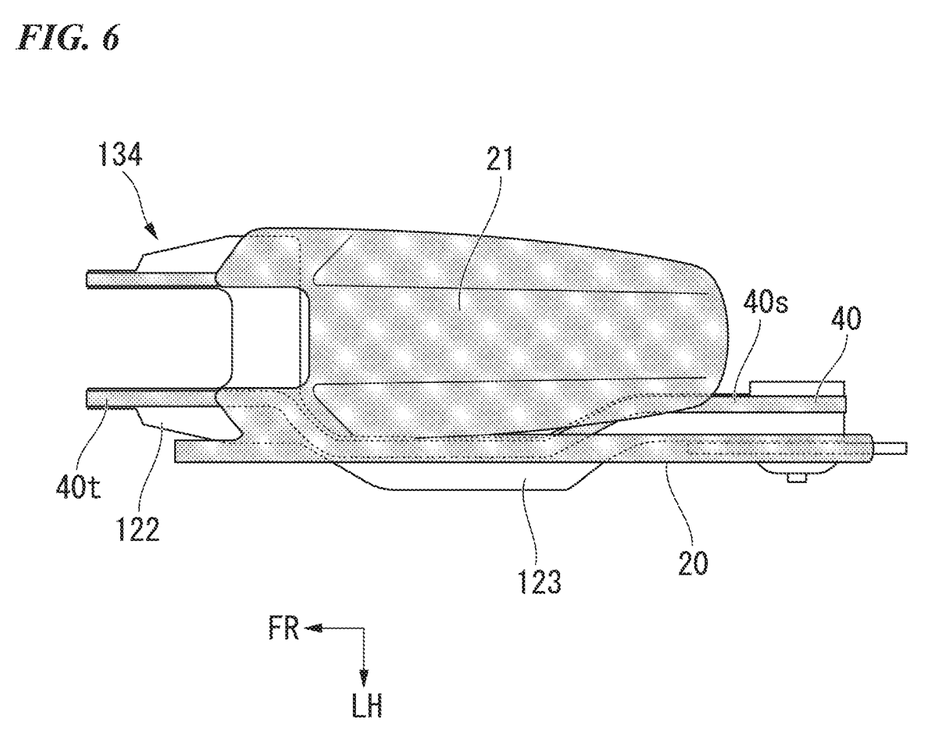
FIG. 6 is a view taken along an arrow VI in FIG. 5 of the saddle riding vehicle of the second embodiment of the present invention.

FIG. 5 is a view showing a portion of a motorcycle (a saddle riding vehicle) of a second embodiment from a left side surface, and FIG. 6 is a view taken along an arrow VI in FIG. 5 of the motorcycle.

A swing arm 134 of the embodiment is a cantilever type swing arm, and includes a pivot section 122 vertically swingably supported by the vehicle body frame, and an arm section 123 extending from an end portion of a left side of the pivot section 122 toward a rear side of the vehicle body.

The series of elongated belt-shaped pieces 40 formed of the carbon fiber reinforced resin are adhered to the outer circumferential surface of the pivot section 122 and the upper surface of the arm section 123 from the lower surface of the arm section 123. Like the first embodiment, the belt-shaped piece 40 has the first reinforcement section 40f, the second reinforcement section 40s and the third reinforcement section 40t. The carbon fiber reinforced resin of the belt-shaped piece 40 is formed such that the carbon fibers are oriented uniformly in the longitudinal direction.

The chain cover 20 and the rear fender 21 are integrally formed by a resin at a region (the second reinforcement section 40s) of the belt-shaped piece 40 which is adhered to the upper surface of the arm section 123. The chain cover 20 is integrated with the arm section 123 of the swing arm 134 to cover over the drive chain 37, and the rear fender 21 is similarly integrated with the arm section 123 of the swing arm 134 to cover over the front section of the rear wheel Wr.

Further, while the chain cover 20 or the rear fender 21 may be reinforced by the carbon fibers similarly to the belt-shaped piece 40, the chain cover 20 or the rear fender 21 may not be reinforced by carbon fibers.

In the swing arm structure according to the embodiment, since the same basic effect as the first embodiment can be obtained and the chain cover 20 and the rear fender 21 are formed integrally at the second reinforcement section 40s on the upper surface of the arm section 123, the number of parts can be reduced and manufacturing costs can be further decreased. In the embodiment, while the chain cover 20 and the rear fender 21 are formed integrally with the second reinforcement section 40s of the upper surface of the arm section 123, only one of the chain cover 20 and the rear fender 21 may be formed integrally with the second reinforcement section 40s.

Further, the present invention is not limited to these embodiments, and various design changes may be made without departing from the scope of the present invention.

In addition, the saddle riding vehicle according to the present invention is not limited to a motorcycle (including a prime-mover-attached bicycle and a scooter type vehicle) and also includes a three-wheeled vehicle (including a two-front-wheeled and one-rear-wheeled vehicle and a one-front-wheeled and two-rear-wheeled vehicle) and a four-wheeled compact vehicle.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A swing arm structure for a saddle riding vehicle comprising:
    a pivot section swingably supported by a vehicle body frame of the saddle riding vehicle;
    an arm section extending from the pivot section toward a rear side of a vehicle body of the saddle riding vehicle and configured to support an axle of a rear wheel of the saddle riding vehicle at a rear section; and
    a first reinforcement section formed of a carbon fiber reinforced resin in which carbon fibers are oriented uniformly in a vehicle body forward/rearward direction,
    wherein the first reinforcement section is installed on a lower surface of the arm section.

2. The swing arm structure for a saddle riding vehicle according to claim 1,
    wherein a second reinforcement section formed of a carbon fiber reinforced resin in which carbon fibers are oriented uniformly in the vehicle body forward/rearward direction is installed on an upper surface of the arm section.

3. The swing arm structure for a saddle riding vehicle according to claim 2,
    wherein the first reinforcement section and the second reinforcement section are connected with each other by a third reinforcement section formed of a carbon fiber reinforced resin installed on the pivot section.

4. The swing arm structure for a saddle riding vehicle according to claim 1,
    wherein the arm section is constituted by a left arm section and a right arm section extending from the pivot section and configured to support the rear wheel from both of left and right sides.

5. The swing arm structure for a saddle riding vehicle according to claim 2,
    wherein a chain cover of the saddle riding vehicle, which is configured to protect a drive chain of the saddle riding vehicle for driving the rear wheel, is formed integrally with the second reinforcement section at the upper surface of the arm section.

6. The swing arm structure for a saddle riding vehicle according to claim 2,
    wherein a rear fender of the saddle riding vehicle, which is configured to cover over the rear wheel, is formed integrally with the second reinforcement section at the upper surface of the arm section.

* * * * *